United States Patent
Luo et al.

(10) Patent No.: US 10,853,416 B2
(45) Date of Patent: Dec. 1, 2020

(54) SIMILAR VIDEO LOOKUP METHOD AND APPARATUS, DEVICE AND STORAGE MEDIUM

(71) Applicant: BAIDU ONLINE NETWORK TECHNOLOGY (BEIJING) CO., LTD., Haidian District Beijing (CN)

(72) Inventors: Junnan Luo, Haidian District Beijing (CN); Leilei Gao, Haidian District Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 228 days.

(21) Appl. No.: 16/115,262

(22) Filed: Aug. 28, 2018

(65) Prior Publication Data
US 2019/0065592 A1 Feb. 28, 2019

(30) Foreign Application Priority Data
Aug. 30, 2017 (CN) .......................... 2017 1 0762918

(51) Int. Cl.
*G06F 16/71* (2019.01)
*G06F 16/732* (2019.01)
(Continued)

(52) U.S. Cl.
CPC .......... *G06F 16/7328* (2019.01); *G06F 16/71* (2019.01); *G06F 16/783* (2019.01);
(Continued)

(58) Field of Classification Search
None
See application file for complete search history.

(56) References Cited

U.S. PATENT DOCUMENTS

| 6,774,917 | B1 * | 8/2004 | Foote ................. G06K 9/00758 |
| | | | 715/700 |
| 2009/0019025 | A1 * | 1/2009 | Chen .................... G06F 16/634 |

(Continued)

FOREIGN PATENT DOCUMENTS

| CN | 103559196 A | 2/2014 |
| CN | 103605786 A | 2/2014 |

(Continued)

OTHER PUBLICATIONS

Chinese Office Action dated Mar. 2, 2020, for related Chinese Appln. No. 201710762918.3; 4 Pages.

(Continued)

*Primary Examiner* — Wilson Lee
(74) *Attorney, Agent, or Firm* — Brooks Kushman PC

(57) ABSTRACT

The present disclosure provides a similar video lookup method and apparatus, a device and a storage medium, wherein the method comprises: during video playing, receiving a similar video lookup request from a user; obtaining a feature vector of a first video segment which is currently being played, wherein each video is divided into a series of video segments according to a predetermined time length; determining a second video segment most similar to the first video segment according to a similarity between feature vectors of respective video segments stored in a database and the feature vector of the first video segment; displaying the second video segment to the user. The solution of the present disclosure can be applied to improve the lookup efficiency.

12 Claims, 2 Drawing Sheets

(51) Int. Cl.
*H04N 21/482* (2011.01)
*H04N 21/84* (2011.01)
*H04N 21/232* (2011.01)
*H04N 21/81* (2011.01)
*G06K 9/00* (2006.01)
*G06F 16/783* (2019.01)
*G06F 16/9032* (2019.01)

(52) U.S. Cl.
CPC .... *G06F 16/90332* (2019.01); *G06K 9/00711* (2013.01); *G06K 9/00744* (2013.01); *H04N 21/232* (2013.01); *H04N 21/482* (2013.01); *H04N 21/8133* (2013.01); *H04N 21/84* (2013.01)

(56) References Cited

U.S. PATENT DOCUMENTS

| | | | |
|---|---|---|---|
| 2014/0244263 | A1 | 8/2014 | Pontual et al. |
| 2017/0242554 | A1 | 8/2017 | Nanjunda Iyer et al. |
| 2017/0251212 | A1* | 8/2017 | Swaminathan ...... H04N 19/176 |
| 2018/0020243 | A1* | 1/2018 | Ni ...................... H04N 21/8549 |
| 2018/0041765 | A1* | 2/2018 | Hua .................. G06K 9/00744 |
| 2018/0101540 | A1* | 4/2018 | Stoop ................. G06F 16/7867 |
| 2020/0154165 | A1* | 5/2020 | Cohen ................. H04N 21/812 |

FOREIGN PATENT DOCUMENTS

| | | |
|---|---|---|
| CN | 104050247 A | 9/2014 |
| CN | 105721925 A | 6/2016 |
| CN | 105760475 A | 7/2016 |
| JP | 2007323319 A | 12/2007 |
| JP | 2016162127 A | 9/2016 |
| JP | 2017502533 A | 1/2017 |
| WO | 2015058332 A1 | 4/2015 |

OTHER PUBLICATIONS

Chinese Search Report dated Feb. 18, 2020 for related Chinese Appln. No. 201710762918.3; 2 Pages.

European Communication 94(3) EPC dated Dec. 6, 2019 for related European Appln. No. 18190323.8; 5 pages.

Japanese Decision on Grant dated Jan. 10, 2020 for related Japanese Appln. No. 2018-159600; 1 page.

Japanese Office Action dated Jan. 7, 2020 for related Japanese Appln. No. 2018-159600; 3 pages.

Korean Office Action dated Feb. 26, 2020, for related Korean Appln. No. 10-2018-0101908; 5 Pages.

* cited by examiner

SIMILAR VIDEO LOOKUP METHOD AND APPARATUS, DEVICE AND STORAGE MEDIUM

The present application claims the priority of Chinese Patent Application No. 201710762918.3, filed on Aug. 30, 2017, with the title of "Similar video lookup method and apparatus, device and storage medium". The disclosure of the above applications is incorporated herein by reference in its entirety.

FIELD OF THE DISCLOSURE

The present disclosure relates to computer application technologies, and particularly to a similar video lookup method and apparatus, a device and a storage medium.

BACKGROUND OF THE DISCLOSURE

During video playing, it is often discovered that a certain video segment in the video is similar to a historical video segment. Such video segment might be a purposeful arrangement to show respect to the classical and past, or might be happen coincidentally and accidentally.

No matter what case, when a user is viewing such video segment, a request to look up for similar video segments often comes to his mind. The request appears particularly prominent when the user is viewing a movie or a sports event.

For example, regarding a video segment in the movie The Bourne Legacy in which Tom Cruise rushes down from Burj Khalifa Tower, a similar video segment also appears in a climax of the movie Resident Evil: Apocalypse put on show in 2004, when Alice also runs down form a discarded tall building and has a duel with the boss in the movie.

Again for example, in the first round of half final between Fútbol Club Barcelona and Getafe Club de Fútbol of King's Football Cup in 06/07 season, Messi consecutively passes five opponent players and successfully goals. This video segment is extremely similar to the goal of Maradona as the king of football in the match between Argentina vs England in the FIFA World Cup in 1986.

Upon viewing the above video segments, the user might feel that the video segments are familiar but fail to remember the video in which the video segments appeared. A usual practice is to resort to a search engine and manually perform lookup/search for similar video segments.

However, it is usually difficult to accurately describe (through a keyword) similar video segments to be found in the search engine. Once the description is inaccurate, desired content might not be found, and then it is necessary to amend the description for further lookup, thereby reducing the lookup efficiency.

SUMMARY OF THE DISCLOSURE

In view of the above, the present disclosure provides a similar video lookup method and apparatus, a device and a storage medium, which can improve the lookup efficiency.

Specific technical solutions are as follows:

A similar video lookup method, comprising:

during video playing, receiving a similar video lookup request from a user;

obtaining a feature vector of a first video segment which is currently being played, wherein each video is divided into a series of video segments according to a predetermined time length;

determining a second video segment most similar to the first video segment according to a similarity between feature vectors of respective video segments stored in a database and the feature vector of the first video segment;

displaying the second video segment to the user.

According to a preferred embodiment of the present disclosure, the obtaining a feature vector of a first video segment which is currently being played comprises:

if the feature vector of the first video segment is stored in the database, directly obtaining the feature vector of the first video segment from the database;

if the feature vector of the first video segment is not stored in the database, generating the feature vector of the first video segment.

According to a preferred embodiment of the present disclosure, the feature vectors of respective video segments are stored in the database in a multi-level inverted index manner.

According to a preferred embodiment of the present disclosure, the method further comprises:

if the feature vector of the first video segment is not stored in the database, after generating the feature vector of the first video segment, mapping and storing the feature vector in a corresponding index table.

According to a preferred embodiment of the present disclosure, the receiving a similar video lookup request from a user comprises:

receiving the similar video lookup request sent by the user in a form of speech.

A similar video lookup apparatus, comprising: a receiving unit, an obtaining unit, a searching unit and a displaying unit;

the receiving unit is configured to, during video playing, receive a similar video lookup request from a user;

the obtaining unit is configured to obtain a feature vector of a first video segment which is currently being played, wherein each video is divided into a series of video segments according to a predetermined time length;

the searching unit is configured to determine a second video segment most similar to the first video segment according to a similarity between feature vectors of respective video segments stored in a database and the feature vector of the first video segment;

the displaying unit is configured to display the second video segment to the user.

According to a preferred embodiment of the present disclosure, if the feature vector of the first video segment is stored in the database, the obtaining unit directly obtains the feature vector of the first video segment from the database;

if the feature vector of the first video segment is not stored in the database, the obtaining unit generates the feature vector of the first video segment.

According to a preferred embodiment of the present disclosure, the feature vectors of respective video segments are stored in the database in a multi-level inverted index manner.

According to a preferred embodiment of the present disclosure, the obtaining unit is further configured to if the feature vector of the first video segment is not stored in the database, the obtaining unit, after generating the feature vector of the first video segment, map and store the feature vector in a corresponding index table.

According to a preferred embodiment of the present disclosure, the receiving unit receives the similar video lookup request sent by the user in a form of speech.

A computer device, comprising a memory, a processor and a computer program which is stored on the memory and runnable on the processor, wherein the processor, upon executing the program, implements the above-mentioned method.

A computer-readable storage medium on which a computer program is stored, wherein the program, when executed by a processor, implements the aforesaid method.

As can be seen from the above introduction, according to the above solutions of the present disclosure, it is possible to during video playing, receive a similar video lookup request from a user, then obtain a feature vector of a first video segment which is currently being played, wherein each video is divided into a series of video segments according to a predetermined time length, and determine a second video segment most similar to the first video segment according to a similarity between feature vectors of respective video segments stored in the database and the feature vector of the first video segment, and then display the second video segment to the user. As compared with the prior art, in the solutions of the present disclosure, the user only needs to send a similar video lookup request, then a similar video segment can be automatically found and displayed to the user, thereby omitting the user's operation such as manual lookup and thereby improving the lookup efficiency, and additionally simplifying the user's operation. In addition, the process of looking up for the similar video segment by no means affects the video that is being played, for example, the user needn't perform processing such as pause, thereby ensuring smoothness of the video playing.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
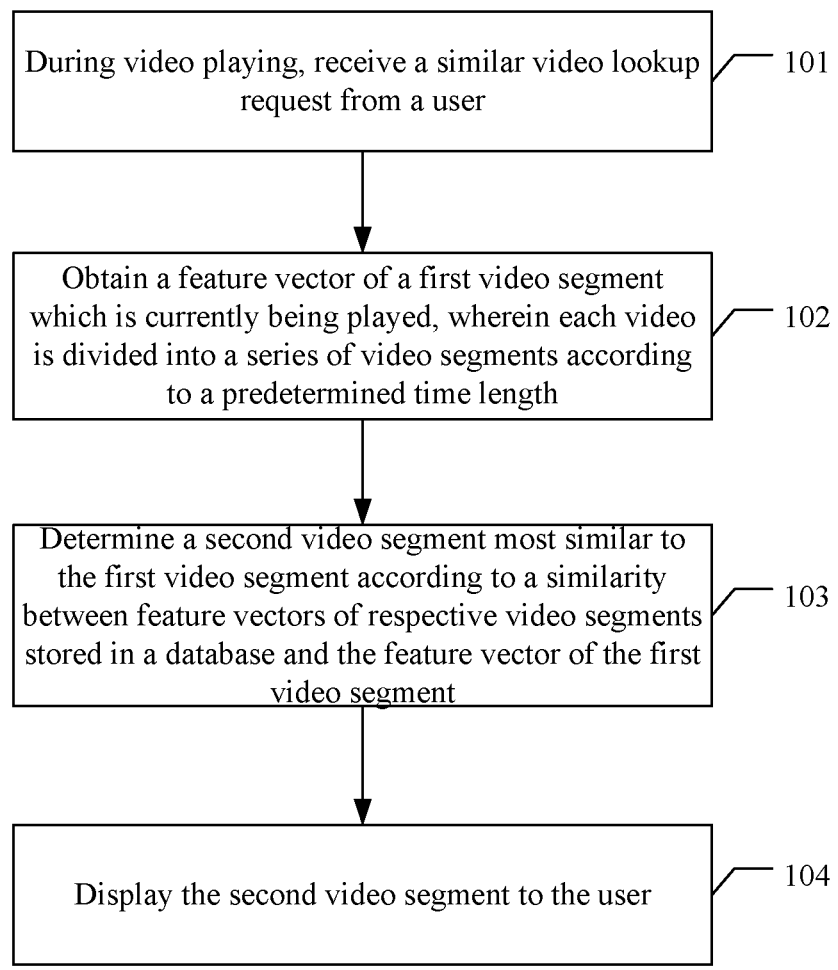
FIG. 1 is a flow chart of an embodiment of a similar video lookup method according to the present disclosure.

FIG. 1 is a flow chart of an embodiment of a similar video lookup method according to the present disclosure. As shown in FIG. 1, the embodiment comprises the following specific implementation mode.

At 101, during video playing, receive a similar video lookup request from a user.

Upon viewing a certain video, the user might feel that the video segment being viewed currently is familiar but fail to remember the video in which the video segment appeared, whereupon he may send a similar video lookup request.

How the user sends the similar video lookup request is not limited.

For example, the user may use a remote controller to send a similar video lookup request, wherein the remote controller may be provided with a specific button. When the button is monitored as being pressed down, it may be believed that the user has sent a similar video lookup request.

Again for example, the user may send, in a speech manner, a similar video lookup request in a form of speech. The content of the speech may be "help me look up for a similar video segment" or "help me look up for a similar picture", or the like.

Preferably, it is feasible to send a similar video lookup request in a speech manner to simplify the user's operation.

At 102 is obtained a feature vector of a first video segment which is currently being played, wherein each video is divided into a series of video segments according to a predetermined time length.

Each video may be divided into a series of video segments according to a predetermined time length. A specific value of the predetermined time length may depend on actual needs, for example 30 seconds. Assuming that a time length of a movie is 120 minutes, the movie may be divided into 240 video segments.

It is possible to, after obtaining the user's similar video lookup request, regard the video segment being played currently as a to-be-processed video segment, and look up for a similar video segment for the video segment.

To distinguish from other video segments that appear subsequently, the video segment being played currently is called a first video segment.

Furthermore, a feature vector of the first video segment may be obtained. A method of obtaining the feature vector is as follows: if the feature vector of the first video segment is stored in a database (video library), directly obtain the feature vector of the first video segment from the database; if the feature vector of the first video segment is not stored in the database, generate the feature vector of the first video segment.

It is feasible to pre-divide videos stored in the database respectively into a series of video segments, and respectively generate and store a feature vector of each video segment.

As such, when the feature vector of the first video segment needs to be obtained, it is possible to look up in the database to find whether the feature vector is stored, and if yes, directly obtain the feature vector from the database, or if no, generate the feature vector.

Preferably, it is possible to, upon looking up in the database to find whether the feature vector is stored, begin to perform feature extraction for the first video segment to generate the feature vector, end up the feature extraction for the first video segment if the feature vector is found in the database, or continue to perform the feature extraction for the first video segment until generating the feature vector if the feature vector is not found in the database. As such, the processing time may be saved so that the feature vector of the first video segment can be obtained as soon as possible.

How to generate the feature vectors of the respective video segments is not limited. For example, it is feasible to perform offline calculation for a lot of video segments as samples, build a model that completely describes the video segment by constantly mining features in the video segment, and finally build a uniform description model for the video segment. Each video segment may be finally described by using vectors representing if features are present or not in the model.

The feature vector is regarded as content identifier of the video segment to thereby achieve an object that the content of the video segment is searchable.

At 103 is determined a second video segment most similar to the first video segment according to a similarity between feature vectors of respective video segments stored in the database and the feature vector of the first video segment.

It is possible to store the feature vectors of the respective video segments in a searchable manner (e.g., Hash), and try to shorten time spent from indexing to result drawing.

Since the video data is in a huge amount, the feature vectors of respective video segments may be stored in a multi-level inverted index manner.

A new video segment and its feature vector are mapped and stored in a corresponding index table. For example, if the feature vector of the first video segment is not stored in the database, the feature vector of the first video segment is generated, and then mapped and stored in a corresponding index table.

Based on the above structures, it is possible to search and find a feature vector most similar to a to-be-searched feature vector, and return a corresponding video segment, namely, return a search result.

Specifically, regarding the feature vector of the first video segment, it is possible to determine a second video segment most similar to the first video segment according to the similarity between feature vectors of respective video segments stored in the database and the feature vector of the first video segment, and the second video segment is a video segment which is pursued for and similar to the first video segment.

At 104, the second video segment is displayed to the user.

After the second video segment is obtained, it may be displayed to the user. The display manner is not limited.

For example, the second video segment may be displayed at a right lower corner of a video playing interface by using a "PiP (Picture-in-Picture)" technique.

The Picture-in-Picture technique simultaneously displays two video signals in a manner of superimposing a big video picture and a small video picture, i.e., while playing a video on a full screen, simultaneously plays the other video on a small area of the picture.

In addition, it is possible to, upon displaying the second video segment to the user, directly play the content of the second video segment, or only prompt the user on the picture that a similar video segment is found and ask the user whether to view, and play the content of the second video segment if the user chooses to view. Furthermore, the user may choose to view the second video segment by enlarging it, e.g., enlarging it to the full screen.

The user may use a remote controller to send an instruction about whether to view or whether to view by enlarging, or may send an instruction about whether to view or whether to view by enlarging through speech. Specific implementation modes are not limited.

While the play of the second video segment is completed and the user continues to view the video where the first video segment lies, if the user again has a demand to look up for a video segment similar to a certain video segment, the process described in the present embodiment is repeated.

The process described in the above embodiment may be illustrated as follows:

Assuming the user is watching in the first round of half final between Fútbol Club Barcelona and Getafe Club de Fútbol of King's Football Cup in 06/07 season, if he wants to look up for a similar video segment after seeing that Messi consecutively passes five opponent players and successfully goals, he may send a similar video lookup request in the form of speech;

Correspondingly, the feature vector of the video segment that "Messi consecutively passes five opponent players and successfully goals" is generated, video segments similar to the video segment that "Messi consecutively passes five opponent players and successfully goals" are sought in the database according to feature vectors of respective video segments stored in the database;

Assuming that a video segment about the goal of Maradona as the king of football in the match between Argentina vs England in the FIFA World Cup in 1986 is found from the search, the video segment is regarded as a video segment similar to the video segment that "Messi consecutively passes five opponent players and successfully goals", and displayed to the user.

To sum up, according to the solution of the above method embodiment, it is possible to during video playing, receive a similar video lookup request from a user, then obtain a feature vector of a first video segment which is currently being played, wherein each video is divided into a series of video segments according to a predetermined time length, and determine a second video segment most similar to the first video segment according to a similarity between feature vectors of respective video segments stored in the database and the feature vector of the first video segment, and then display the second video segment to the user. As compared with the prior art, in the solution of the above method embodiment, the user only needs to send a similar video lookup request, then a similar video segment can be automatically found and displayed to the user, thereby omitting the user's operation such as manual lookup and thereby improving the lookup efficiency, and additionally simplifying the user's operation. In addition, the process of looking up for the similar video segment by no means affects the video that is being played, for example, the user needn't perform processing such as pause, thereby ensuring smoothness of the video playing.

The above introduces the method embodiments. The solution of the present disclosure will be further described through an apparatus embodiment.

Figure 2:
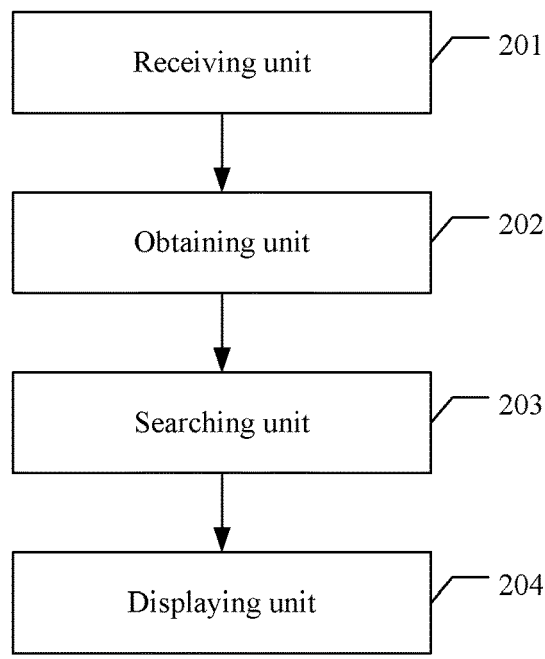
FIG. 2 is a structural schematic diagram of components of an embodiment of a similar video lookup apparatus according to the present disclosure.

FIG. 2 is a structural schematic diagram of components of an embodiment of a similar video lookup apparatus according to the present disclosure. As shown in FIG. 2, the apparatus comprises: a receiving unit 201, an obtaining unit 202, a searching unit 203 and a displaying unit 204.

The receiving unit 201 is configured to, during video playing, receive a similar video lookup request from a user.

The obtaining unit 202 is configured to obtain a feature vector of a first video segment which is currently being played, wherein each video is divided into a series of video segments according to a predetermined time length.

The searching unit 203 is configured to determine a second video segment most similar to the first video segment according to a similarity between feature vectors of respective video segments stored in a database and the feature vector of the first video segment.

The displaying unit 204 is configured to display the second video segment to the user.

Upon viewing a certain video, the user might feel that the video segment being viewed currently is familiar but fail to remember the video in which the video segment appeared, whereupon he may send a similar video lookup request.

How the user sends the similar video lookup request is not limited.

For example, the user may use a remote controller to send a similar video lookup request, wherein the remote controller may be provided with a specific button. When the button is monitored as being pressed down, it may be believed that the user has sent a similar video lookup request.

Again for example, the user may send, in a speech manner, a similar video lookup request in a form of speech. The content of the speech may be "help me look up for a similar video segment" or "help me look up for a similar picture", or the like.

Preferably, it is feasible to send a similar video lookup request in a speech manner to simplify the user's operation.

After receiving the similar video lookup request from the user, the receiving unit 201 may inform the obtaining unit 202 to perform its own function, and correspondingly, the obtaining unit 202 may obtain the feature vector of the first video segment that is being played currently.

Each video may be divided into a series of video segments according to a predetermined time length. A specific value of the predetermined time length may depend on actual needs, for example 30 seconds. Assuming that a time length of a movie is 120 minutes, the movie may be divided into 240 video segments.

A manner in which the obtaining unit 202 obtains the feature vector of the first video segment is as follows: if the feature vector of the first video segment is stored in a database, directly obtain the feature vector of the first video segment from the database; if the feature vector of the first video segment is not stored in the database, generate the feature vector of the first video segment.

It is feasible to pre-divide videos stored in the database respectively into a series of video segments, and respectively generate and store a feature vector of each video segment.

As such, when the feature vector of the first video segment needs to be obtained, the obtaining unit 202 looks up in the database to find whether the feature vector is stored, and if yes, directly obtain the feature vector from the database, or if no, generate the feature vector.

Preferably, it is possible to, upon looking up in the database to find whether the feature vector is stored, the obtaining unit 202 begins to perform feature extraction for the first video segment to generate the feature vector, end up the feature extraction for the first video segment if the feature vector is found in the database, or continue to perform the feature extraction for the first video segment until generating the feature vector if the feature vector is not found in the database. As such, the processing time may be saved so that the feature vector of the first video segment can be obtained as soon as possible.

The feature vectors of respective video segments may be stored in the database in a multi-level inverted index manner. Furthermore, a new video segment and its feature vector need to be mapped and stored in a corresponding index table. For example, if the feature vector of the first video segment is not stored in the database, the obtaining unit 202, after generating the feature vector of the first video segment, maps and stores the feature vector in a corresponding index table.

The obtaining unit 202 may send the feature vector of the first video segment to the searching unit 203 so that the searching unit 203 determines a second video segment most similar to the first video segment according to the similarity between feature vectors of respective video segments stored in the database and the feature vector of the first video segment, and then the displaying unit 204 displays the second video segment to the user.

The displaying manner is not limited. For example, the second video segment may be displayed at a right lower corner of a video playing interface by using a "Picture-in-Picture" technique.

Reference may be made to corresponding depictions in the aforesaid method embodiment for a specific workflow of the apparatus embodiment shown in FIG. 2. The workflow is not detailed any more.

According to the solution of the above apparatus embodiment, it is possible to during video playing, receive a similar video lookup request from a user, then obtain a feature vector of a first video segment which is currently being played, wherein each video is divided into a series of video segments according to a predetermined time length, and determine a second video segment most similar to the first video segment according to a similarity between feature vectors of respective video segments stored in the database and the feature vector of the first video segment, and then display the second video segment to the user. As compared with the prior art, in the solution of the above apparatus embodiment, the user only needs to send a similar video lookup request, then a similar video segment can be automatically found and displayed to the user, thereby omitting the user's operation such as manual lookup and thereby improving the lookup efficiency, and additionally simplifying the user's operation. In addition, the process of looking up for the similar video segment by no means affects the video that is being played, for example, the user needn't perform processing such as pause, thereby ensuring smoothness of the video playing.

Figure 3:
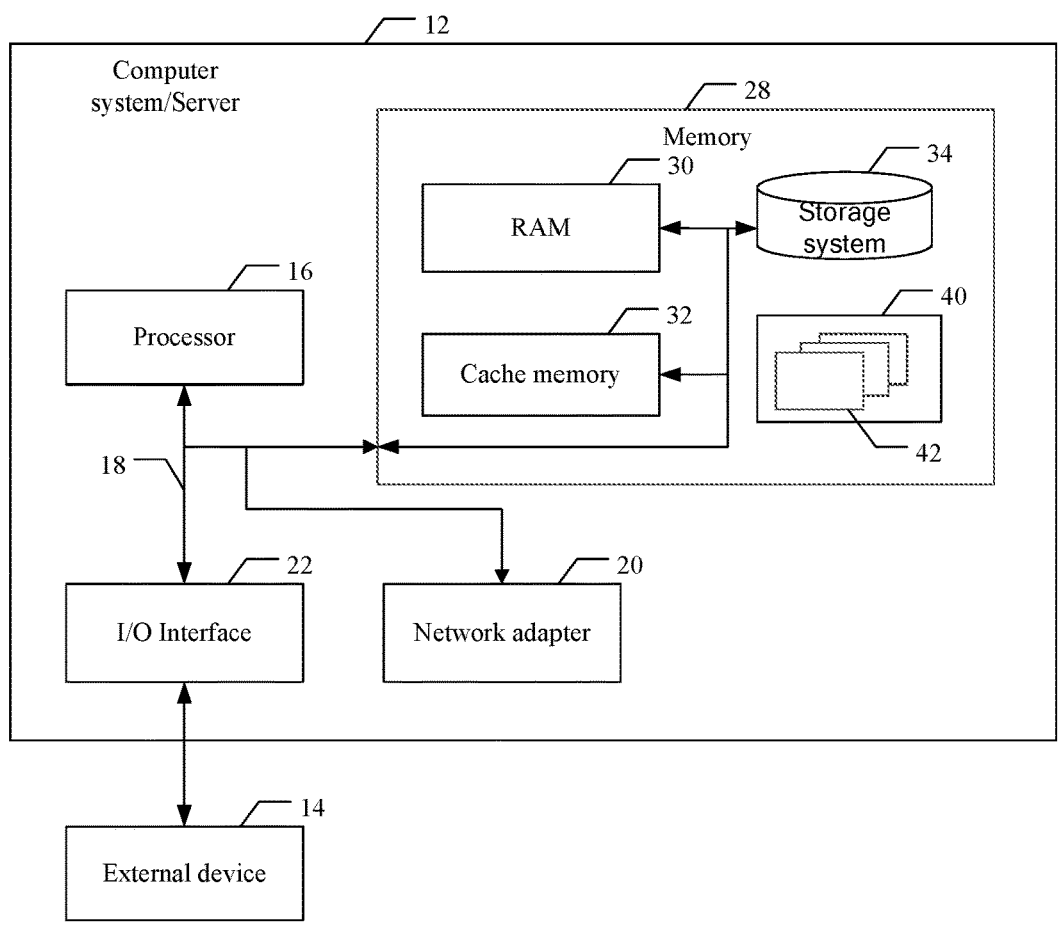
FIG. 3 illustrates a block diagram of an example computer system/server 12 adapted to implement an implementation mode of the present disclosure.

FIG. 3 illustrates a block diagram of an example computer system/server 12 adapted to implement an implementation mode of the present disclosure. The computer system/server 12 shown in FIG. 3 is only an example and should not bring about any limitation to the function and scope of use of the embodiments of the present disclosure.

As shown in FIG. 3, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown in FIG. 3 and typically called a "hard drive"). Although not shown in FIG. 3, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 3, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiment shown in FIG. 1, namely, during video playing, receive a similar video lookup request from a user; obtain a feature vector of a first video segment which is currently being played, wherein each video is divided into a series of video segments according to a predetermined time length; determine a second video segment most similar to the first video segment according to a similarity between feature vectors of respective video segments stored in the database and the feature vector of the first video segment; display the second video segment to the user.

Reference may be made to related depictions in the above embodiments for specific implementations, which will not be detailed any more.

The present disclosure meanwhile provides a computer-readable storage medium on which a computer program is stored, the program, when executed by the processor, implementing the method stated in the embodiment shown in FIG. 1.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A computer-implemented similar video lookup method, wherein the method comprises:
   during video playing, receiving a similar video lookup request from a user;
   obtaining a feature vector of a first video segment which is currently being played, wherein each video is divided into a series of video segments according to a predetermined time length;
   determining a second video segment most similar to the first video segment according to a similarity between feature vectors of respective video segments stored in a database and the feature vector of the first video segment; and
   displaying the second video segment to the user,
   wherein the obtaining a feature vector of a first video segment which is currently being played comprises:
   if the feature vector of the first video segment is stored in the database, directly obtaining the feature vector of the first video segment from the database; and
   if the feature vector of the first video segment is not stored in the database, generating the feature vector of the first video segment.

2. The method according to claim 1, wherein the feature vectors of respective video segments are stored in the database in a multi-level inverted index manner.

3. The method according to claim 2, wherein the method further comprises:
   if the feature vector of the first video segment is not stored in the database, after generating the feature vector of the first video segment, mapping and storing the feature vector in a corresponding index table.

4. The method according to claim 1, wherein
   the receiving a similar video lookup request from a user comprises:
   receiving the similar video lookup request sent by the user in a form of speech.

5. A computer device, comprising a memory, a processor and a computer program which is stored on the memory and runnable on the processor, wherein the processor, upon executing the program, implements a similar video lookup method, wherein the method comprises:
   during video playing, receiving a similar video lookup request from a user;
   obtaining a feature vector of a first video segment which is currently being played, wherein each video is divided into a series of video segments according to a predetermined time length;
   determining a second video segment most similar to the first video segment according to a similarity between feature vectors of respective video segments stored in a database and the feature vector of the first video segment; and
   displaying the second video segment to the user,
   wherein the obtaining a feature vector of a first video segment which is currently being played comprises:
   if the feature vector of the first video segment is stored in the database, directly obtaining the feature vector of the first video segment from the database; and
   if the feature vector of the first video segment is not stored in the database, generating the feature vector of the first video segment.

6. The computer device according to claim 5, wherein the feature vectors of respective video segments are stored in the database in a multi-level inverted index manner.

7. The computer device according to claim 6, wherein the method further comprises:
   if the feature vector of the first video segment is not stored in the database, after generating the feature vector of the first video segment, mapping and storing the feature vector in a corresponding index table.

8. The computer device according to claim 5, wherein
   the receiving a similar video lookup request from a user comprises:
   receiving the similar video lookup request sent by the user in a form of speech.

9. A non-transitory computer-readable storage medium on which a computer program is stored, wherein the program, when executed by a processor, implements a similar video lookup method, wherein the method comprises:
   during video playing, receiving a similar video lookup request from a user;
   obtaining a feature vector of a first video segment which is currently being played, wherein each video is divided into a series of video segments according to a predetermined time length;
   determining a second video segment most similar to the first video segment according to a similarity between feature vectors of respective video segments stored in a database and the feature vector of the first video segment; and
   displaying the second video segment to the user,
   wherein the obtaining a feature vector of a first video segment which is currently being played comprises:
   if the feature vector of the first video segment is stored in the database, directly obtaining the feature vector of the first video segment from the database; and
   if the feature vector of the first video segment is not stored in the database, generating the feature vector of the first video segment.

10. The non-transitory computer-readable storage medium according to claim 9, wherein the feature vectors of respective video segments are stored in the database in a multi-level inverted index manner.

11. The non-transitory computer-readable storage medium according to claim 10, wherein the method further comprises:
    if the feature vector of the first video segment is not stored in the database, after generating the feature vector of the first video segment, mapping and storing the feature vector in a corresponding index table.

12. The non-transitory computer-readable storage medium according to claim 9, wherein
    the receiving a similar video lookup request from a user comprises:
    receiving the similar video lookup request sent by the user in a form of speech.

* * * * *